United States Patent
Lin et al.

(10) Patent No.: US 10,176,129 B2
(45) Date of Patent: Jan. 8, 2019

(54) CONTROL METHOD FOR I²C DEVICE OF I²C SYSTEM AND I²C DEVICE USING THE SAME

(71) Applicant: NOVATEK Microelectronics Corp., Hsin-Chu (TW)

(72) Inventors: Chih-Huang Lin, Hsinchu (TW); Hong-Chu Chen, Hsinchu (TW); Min-Hui Chu, Hsinchu County (TW); Chin-Hui Huang, Hsinchu (TW); Wei-Lung Liu, Hsinchu County (TW); Tai-Yu Chiu, Hsinchu County (TW); Chao-Chun Huang, Taipei (TW); Su-Wei Lien, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 161 days.

(21) Appl. No.: 15/213,407

(22) Filed: Jul. 19, 2016

(65) Prior Publication Data
US 2017/0371819 A1 Dec. 28, 2017

Related U.S. Application Data

(60) Provisional application No. 62/353,050, filed on Jun. 22, 2016.

(51) Int. Cl.
*G06F 13/00* (2006.01)
*G06F 13/364* (2006.01)
*G06F 13/366* (2006.01)
*G06F 13/42* (2006.01)

(52) U.S. Cl.
CPC .......... *G06F 13/364* (2013.01); *G06F 13/366* (2013.01); *G06F 13/4282* (2013.01)

(58) Field of Classification Search
CPC .......................... G06F 13/366; G06F 13/4282
See application file for complete search history.

(56) References Cited

U.S. PATENT DOCUMENTS

| 8,719,476 | B2 | 5/2014 | Tokuda | |
|---|---|---|---|---|
| 2015/0074305 | A1 | 3/2015 | Sengoku | |
| 2015/0095537 | A1 | 4/2015 | Sengoku | |
| 2016/0034417 | A1* | 2/2016 | Chavez | G06F 13/4282 710/110 |

* cited by examiner

*Primary Examiner* — Zachary K Huson
(74) *Attorney, Agent, or Firm* — Winston Hsu

(57) ABSTRACT

A control method for a first device of an inter-integrated circuit (I²C) system including a microcontroller unit (MCU), includes receiving a first indication from the MCU of the I²C system, wherein the first indication configures the first device from a slave mode to a master mode; polling the first device itself for status information of the first device when the first device is in the master mode; determining whether the status information of the first device matches a target status after polling; and determining to perform a parameter adjustment on a second device of the I²C system when determining that the status information of the first device matches the target status.

16 Claims, 7 Drawing Sheets

CONTROL METHOD FOR I²C DEVICE OF I²C SYSTEM AND I²C DEVICE USING THE SAME

CROSS REFERENCE TO RELATED APPLICATIONS

This application claims the benefit of U.S. Provisional Application No. 62/353,050, filed on Jun. 22, 2016, the contents of which are incorporated herein by reference.

BACKGROUND OF THE INVENTION

1. Field of the Invention

The present invention relates to a method used in an inter-integrated circuit (I²C) system, and more particularly, to a control method for an I²C device of an I²C system and the related I²C device.

2. Description of the Prior Art

With advancements in technology, the size of an electronic system becomes larger and larger, where more and more elements are required in the electronic system. Inter-integrated circuit (I²C) is a typical two-wire interface for connecting peripheral devices with a processor or a microcontroller unit (MCU) in the electronic system, allowing the processor or MCU to communicate with these peripheral devices.

According to the specification of the I²C system, the devices in the I²C system include a master device and several slave devices. A master device should poll a slave device to obtain information from the slave device. More specifically, the master device needs to poll the slave device and checks if a status of the slave device changes, and then performs a specific operation accordingly. The polling operation consumes a lot of time and causes the master device to be busy if a large number of slave devices in the I²C system need to be polled. The I²C bus is also busy, resulting in higher electromagnetic interferences in the electronic system. Another method allows the master device to obtain information from a slave device via another line, which requires additional lines and I/O pins, and thereby increases circuit costs, especially when the I²C system includes a large number of slave devices. Thus, there is a need for improvement over the prior art.

SUMMARY OF THE INVENTION

It is therefore an objective of the present invention to provide a control method for a device of an inter-integrated circuit (I²C) system, to reduce or simplify the polling operations, in order to improve the efficiency of the I²C system.

The present invention discloses a control method for a first device of an I²C system comprising a microcontroller unit (MCU). The control method comprises receiving a first indication from the MCU of the I²C system, wherein the first indication configures the first device from a slave mode to a master mode; polling the first device itself for status information of the first device when the first device is in the master mode; determining whether the status information of the first device matches a target status after polling; and determining to perform a parameter adjustment on a second device of the I²C system when determining that the status information of the first device matches the target status.

The present invention further discloses a device of an I²C system. The device supports a master mode and a slave mode, and comprises a register module, a register control module and an I²C controller. The register module is used for storing status information and mode information of the device. The register control module, coupled to the register module, is used for performing the following steps: polling the register module for the status information of the device when the device is in the master mode; determining whether the status information of the device matches a target status after polling; and determining to perform a parameter adjustment on an I²C device of the I²C system when determining that the status information of the device matches the target status. The I²C controller, coupled to the register module and the register control module, is used for receiving a first indication from the MCU, wherein the first indication configures the device from the slave mode to the master mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
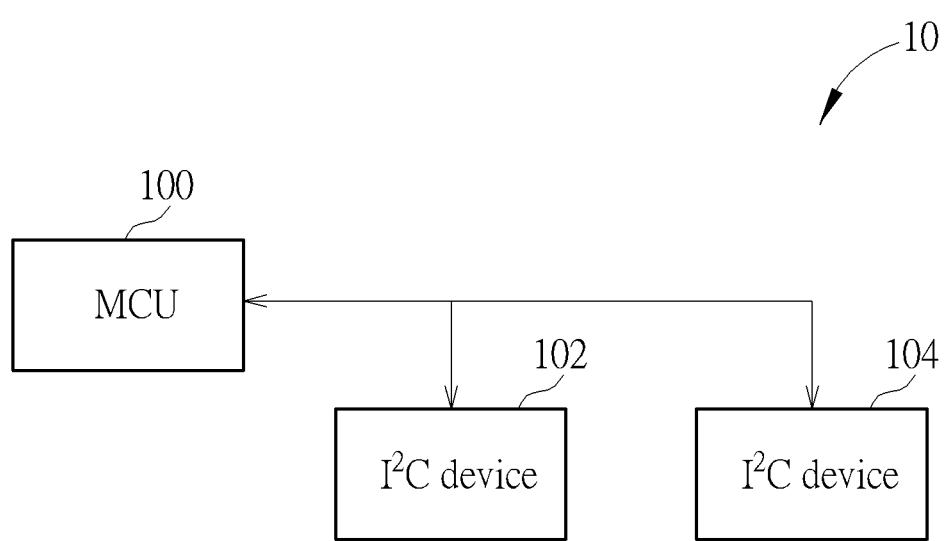
FIG. 1 is a schematic diagram of an inter-integrated circuit (I²C) system.

Please refer to FIG. 1, which is a schematic diagram of an inter-integrated circuit (I²C) system 10. The I²C system 10 includes a microcontroller unit (MCU) 100 and I²C devices 102 and 104. In the I²C system 10, the MCU 100 acts as a master device and the I²C devices 102 and 104 act as slave devices. According to the I²C specification, if the master device needs to obtain information from a slave device, the master device should perform polling on the slave device. For example, in the I²C system 10, the MCU 100 is required to perform parameter adjustment on the I²C device 102 based on information obtained from the I²C device 104. In this embodiment, the MCU 100 may poll the I²C device 104 to obtain the information and configure the I²C device 102 accordingly.

Figure 2:
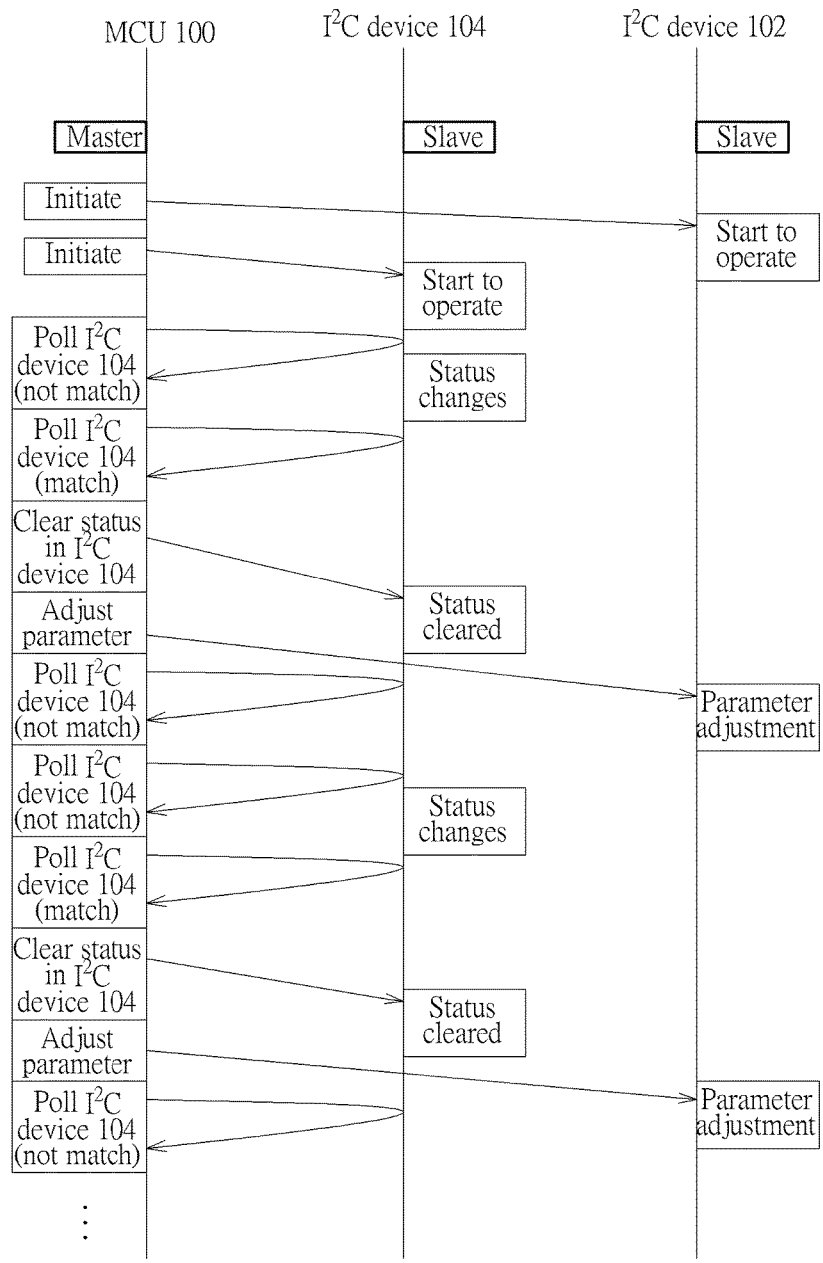
FIG. 2 is a schematic diagram of message flows of the I²C system shown in FIG. 1.

Please refer to FIG. 2, which is a schematic diagram of message flows of the I²C system 10. First of all, the MCU 100 (i.e., the master device) transmits signals to initiate the I²C devices 102 and 104 (i.e., the slave devices), and the I²C devices 102 and 104 start to operate. Subsequently, the MCU 100 keeps polling the I²C device 104 to obtain its status information; that is, the MCU 100 keeps polling the I²C device 104 to check if a status of the I²C device 104 changes. In detail, the MCU 100 may transmit a polling request on the I²C bus, including an address of the I²C device 104 that the MCU 100 likes to poll and an address of a status register of the I²C device 104; and when the I²C device 104 receives the polling request through the I²C bus and recognizes that the polling request is configured to the I²C device 104, the I²C device 104 then replies a polling response, including the status information (e.g., a value stored in the status register of the I²C device 104), to the MCU 100. If the MCU 100 determines that the received status information does not match a target status, the MCU 100 then transmits another polling request to the I²C device 104. When the MCU 100 receives the polling response that includes the status information matching the target status, the MCU 100 may transmit a signal to the I²C device 102 to adjust a parameter of the I²C device 102. The MCU 100 also transmits a signal to clear the status in the I²C device 104, e.g., clear a flag for indicating the status matching. The above operations are repeated in the I²C system 10.

A general I²C system includes a serial clock line (SCL) for transmitting clock signals and a serial data line (SDA) for transmitting data. Conventionally, the polling operations of the master device in the I²C system mean that the master device transmits a message on the SDA to a slave device, where the message indicates that the master device needs to read data in a register of a specific slave device. This message may be forwarded to every slave device on the I²C bus, but only the specific slave device reacts in response to this message. This slave device replies a response message to the master device, and the response message indicates the register data or the status queried by the master device. After receiving the register data or the status of the slave device, the master device may determine whether the status of the slave device matches the target status. The determination result may lead to a specific operation or configuration performed by the master device, e.g., a parameter adjustment of a slave device.

As can be seen in FIG. 2, the polling operations include frequent message transmission and reception between the MCU 100 and the I²C device 104. This occupies a lot of resources of the MCU 100, especially when there are a large number of slave devices in the I²C system required to be polled. In addition, the I²C bus is always toggled by the transmissions of polling requests and responses, which may easily interfere with other circuit elements in the electronic system and thus generate electromagnetic interference problems.

Figure 3:
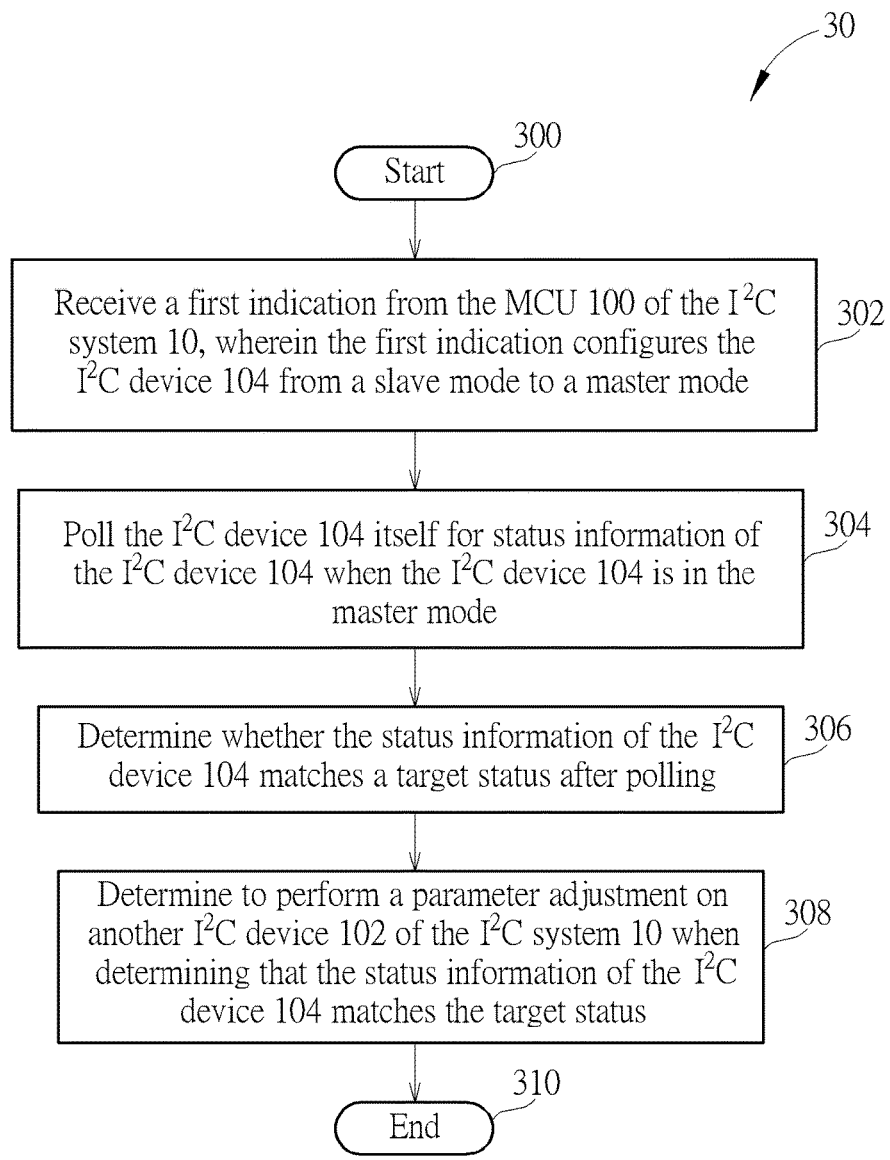
FIG. 3 is a schematic diagram of a process according to an embodiment of the present invention.

Please refer to FIG. 3, which is a schematic diagram of a process 30 according to an embodiment of the present invention. As shown in FIG. 3, the process 30 may be implemented in an I²C device of an I²C system, e.g., the I²C device 104 of the I²C system 10 shown in FIG. 1, and includes the following steps:

Step 300: Start.
Step 302: Receive a first indication from the MCU 100 of the I²C system 10, wherein the first indication configures the I²C device 104 from a slave mode to a master mode.
Step 304: Poll the I²C device 104 itself for status information of the I²C device 104 when the I²C device 104 is in the master mode.
Step 306: Determine whether the status information of the I²C device 104 matches a target status after polling.
Step 308: Determine to perform a parameter adjustment on another I²C device 102 of the I²C system 10 when determining that the status information of the I²C device 104 matches the target status.
Step 310: End.

According to the process 30, the I²C device 104 supports a master mode and a slave mode. The I²C device 104 receives a first indication from the MCU 100, where the first indication configures the I²C device 104 from the slave mode to the master mode. In other words, by transmitting the first indication, the MCU 100 configures the I²C device 104 to the master mode. The MCU 100 also configures itself to the slave mode accordingly. Therefore, the I²C device 104 may act as a master device and start the polling operations for itself. The I²C device 104 may poll itself for status information of the I²C device 104, and determine whether the status information of the I²C device 104 matches a target status after polling. After determining that the status information matches the target status, the I²C device 104 determines to perform a parameter adjustment on the I²C device 102.

Figure 4:
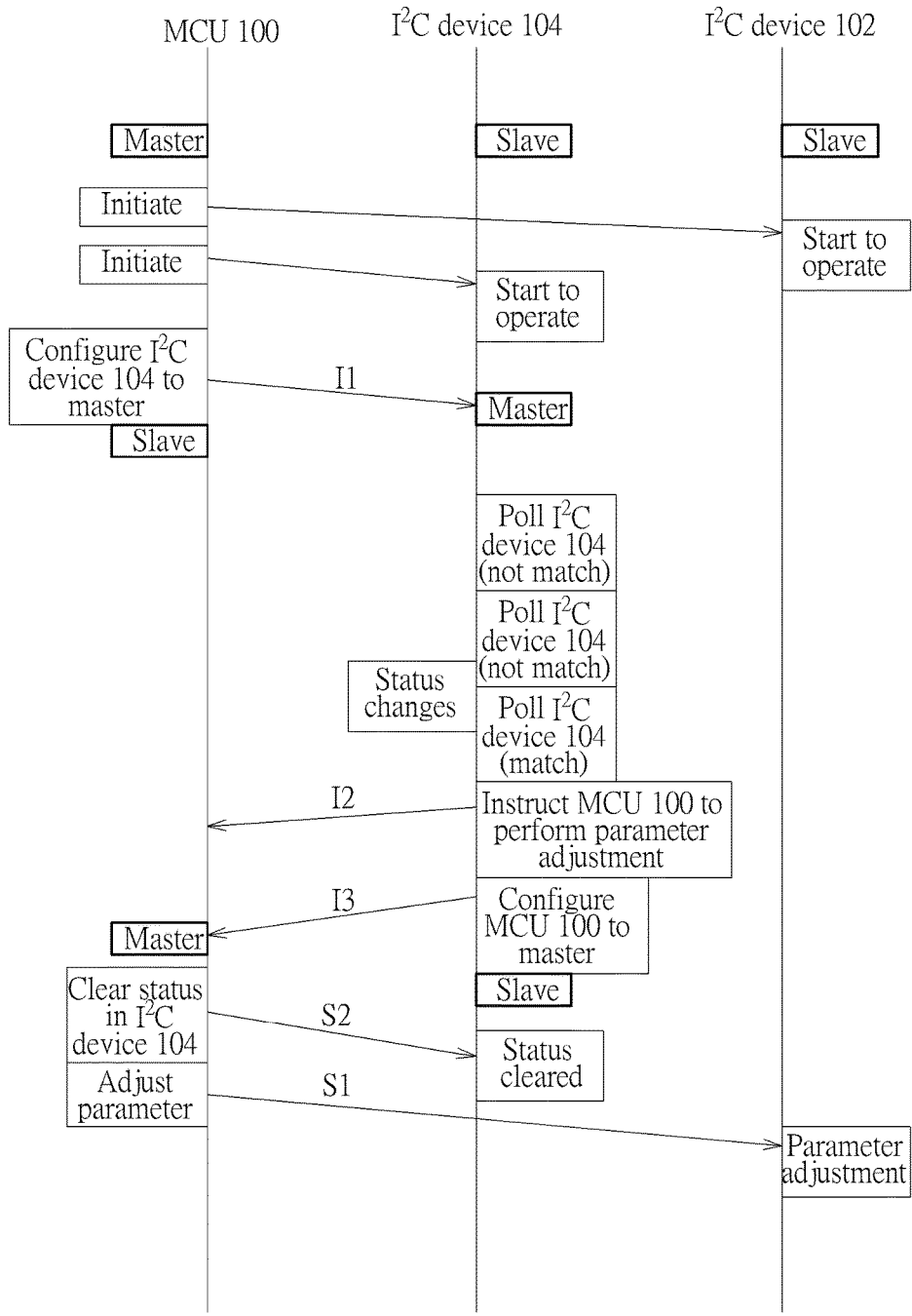
FIG. 4 is a schematic diagram of message flows of the I²C system based on the process shown in FIG. 3.

Please refer to FIG. 4, which is a schematic diagram of message flows of the I²C system 10 based on the process 30. Similarly, in the initial condition, the MCU 100 acts as a master device and the I²C devices 102 and 104 act as slave devices. The MCU 100 transmits signals to initiate the I²C devices 102 and 104, and the I²C devices 102 and 104 start to operate. Subsequently, the MCU 100 transmits a first indication I1 to the I²C device 104, to configure the I²C device 104 from the slave mode to the master mode, and the MCU 100 also configures itself to the slave mode. In such a situation, the MCU 100 acts as a slave device and the I²C device 104 acts as a master device.

In detail, the I²C device 104 may include a mode switch register indicating to operate in the master mode or the slave mode. The first indication I1 may include but is not limited to an address of the I²C device 104, a write signal, an address of the mode switch register of the I²C device 104, and a value indicating the master mode to be set in the mode switch register of the I²C device 104. After the I²C device 104 receives the first indication I1 and determines that the first indication I1 is configured to the I²C device 104 according to the address, the I²C device 104 may write the value indicating the master mode into the mode switch register according to the information carried by the first indication I1, allowing the I²C device 104 to enter the master mode.

Subsequently, the I²C device 104 keeps polling itself to obtain the status information when it is in the master mode; that is, the I²C device 104 keeps polling itself to check if a status of the I²C device 104 changes and matches a target status. If the detected status information does not match the target status, the I²C device 104 then polls itself again. After the I²C device 104 determines that the status information matches the target status, the I²C device 104 may determine to perform the parameter adjustment on the I²C device 102.

In response to determining that the status information of the I²C device 104 matches the target status, the I²C device 104 may transmit a second indication I2 to the MCU 100, to instruct the MCU 100 to perform the parameter adjustment on the I²C device 102. The second indication I2 may include but is not limited to an address of the MCU 100, a write signal, an address of a designated register of the MCU 100 or a flag of the MCU 100, and a value to be set in the designated register or the flag, wherein the designated register or the flag indicates that a parameter register of the I²C device 102 is to be adjusted. Therefore, after receiving the second indication I2, the MCU 100 may know that the second indication I2 is configured to the MCU 100 according to the address. The MCU 100 may also know which parameter register of the I²C device 102 needs to be adjusted according to the address and the setting value of the register or the flag. Note that the value to be set in the designated register of the MCU 100 may be a parameter value to be set in the parameter register of the I²C device 102. Alternatively, if the value to be set in the designated register or the flag of the MCU 100 is a simple value such as 0 or 1 instructing to perform the parameter adjustment, the second indication may further include a parameter value to be set in the parameter register of the I²C device 102. For example, the parameter register of the I²C device 102 may be associated with brightness control, contrast control, or saturation control on images displayed in the I²C device 102, and the parameter value may indicate the brightness, contrast, or saturation to be applied.

In addition, the I²C device 104 may further transmit a third indication I3 to the MCU 100, where the third indication I3 configures the MCU 100 from the slave mode to the master mode. After switched to the master mode, the MCU 100 is allowed to perform the parameter adjustment on the I²C device 102. Accordingly, the I²C device 104 also configures itself to the slave mode. In detail, the MCU 100 may also include a mode switch register indicating to operate in the master mode or the slave mode. The third indication I3 may include but is not limited to an address of the MCU 100, a write signal, an address of the mode switch register of the MCU 100, and a value indicating the master mode to be set in the mode switch register of the MCU 100. After the MCU 100 receives the third indication I3 and determines that the third indication I3 is configured to the MCU 100 according to the address, the MCU 100 may write the value indicating the master mode into the mode switch register according to the information carried by the third indication I3, allowing the MCU 100 to enter the master mode. Note that the second indication I2 and the third indication I3 transmitted by the I²C device 104 may be transmitted separately as shown in FIG. 4, or integrated to one indication message; this is not limited herein.

As shown in FIG. 4, after the MCU 100 enters the master mode, the MCU 100 is able to transmit a signal S1 to configure the I²C device 102 to adjust the parameter. The MCU 100 also transmits a signal S2 to clear the status in the I²C device 104, e.g., clear a flag for indicating the status matching.

Please note that the embodiment of message flows shown in FIG. 4 is one of various embodiments of the present invention. For example, the parameter adjustment of the I²C device 102 may be performed by the I²C device 104 instead of the MCU 100. Please refer to FIG. 5, which is a schematic diagram of another example of message flows of the I²C system 10 based on the process 30. Similarly, in the operations shown in FIG. 5, the I²C device 104 also receives the first indication I1 from the MCU 100, and is configured from the slave mode to the master mode by the first indication I1. The I²C device 104 then polls itself for status information in the master mode. After the I²C device 104 determines that the status information matches the target status, the I²C device 104 may determine to perform the parameter adjustment on the I²C device 102. Different from the operations of transmitting the second indication I2 to the MCU 100 to instruct the MCU 100 to perform parameter adjustment on the I²C device 102 as shown in FIG. 4, in the message flows shown in FIG. 5, the I²C device 104 directly performs parameter adjustment on the I²C device 102. In detail, the I²C device 104 may transmit an indication I4 to the I²C device 102 via the I²C bus, and the indication I4 includes but is not limited to an address of the I²C device 102, a write signal, an address of a parameter register to be adjusted of the I²C device 102, and a parameter value to be set in the parameter register. After the I²C device 102 receives the indication I4 and determines that the indication I4 is used for the I²C device 102 according to the address, the I²C device 102 may write the parameter value in the parameter register according to the information carried by the indication I4. For example, the parameter register of the I²C device 102 may be associated with brightness control, contrast control, or saturation control on images displayed in the I²C device 102, and the parameter value may indicate the brightness, contrast, or saturation to be applied.

After the parameter adjustment of the I²C device 102 is completed, if it is necessary, the I²C device 104 may transmit another indication I5 to the MCU 100, to configure the MCU 100 to the master mode. The content of the indication I5 is similar to the content of the indication I3, and will not be narrated herein. The I²C device 104 may transmit the indication I5 to configure the MCU 100 to the master mode at any time according to a predefined configuration, and the I²C device 104 configures itself to the slave mode accordingly. The I²C device 104 may be configured to return to the slave mode at any time. Alternatively, the MCU 100 is capable of automatically configuring itself to the master mode. Since the I²C system cannot have two master devices simultaneously according to its specification, the I²C device 104 should return to the slave mode when the MCU 100 automatically changes to the master mode.

Please note that the above self-polling operations of the I²C device 104 are performed periodically; that is, the I²C device 104 may poll itself for the status information of the I²C device 104 periodically. The period of polling may be configured arbitrarily.

Figure 5:
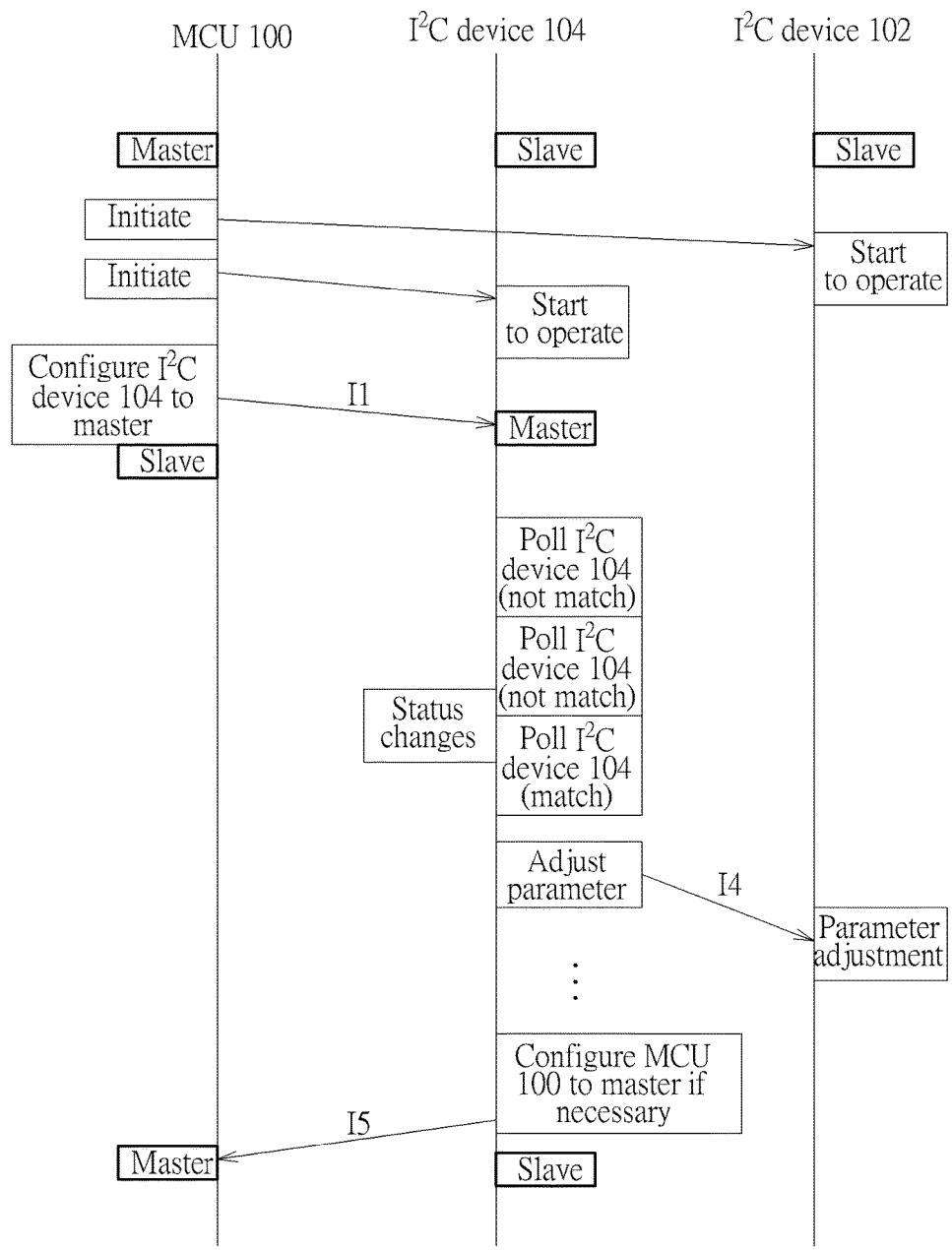
FIG. 5 is a schematic diagram of another example of message flows of the I²C system based on the process 30 shown in FIG. 3.

As can be seen in the message flows shown in FIG. 4 and FIG. 5 in comparison with those shown in FIG. 2, the self-polling operations of the present invention significantly reduce the loading of the MCU 100. In such a condition, the MCU 100 may allocate more resources to deal with other tasks, in order to improve system efficiency. Also, the self-polling operations reduce the quantity of signal transmissions on the I²C bus since the polling requests and the polling responses may not be transmitted via the I²C bus. This reduces electromagnetic interference problems generated from the I²C bus.

Figure 6:
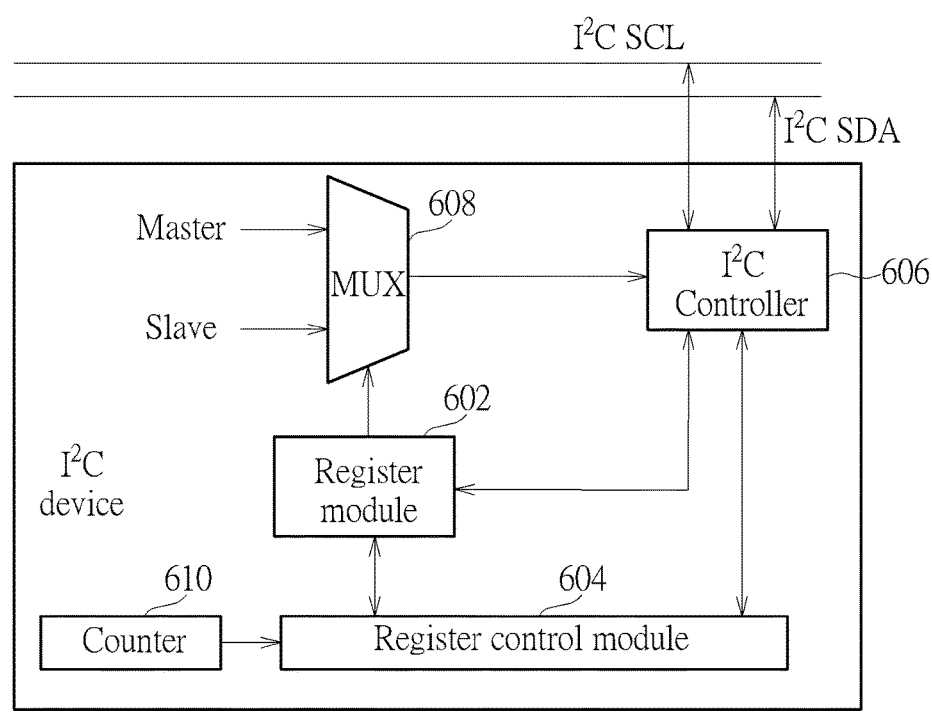
FIG. 6 is a schematic diagram of a detailed structure of an I²C device.

Please refer to FIG. 6, which is a schematic diagram of a detailed structure of an I²C device. This I²C device may be the I²C device 102 or 104 or the MCU 100 shown in FIG. 1. In this embodiment, the I²C device is used for illustrating the I²C device 104, which is used for polling itself for status information. In detail, the I²C device includes a register module 602, a register control module 604, an I²C controller 606, a multiplexer (MUX) 608 and a counter 610. The register module 602 includes registers of the I²C device, such as a mode switch register (for storing mode information of the I²C device), status register (s) (for storing status information of the I²C device), and registers with other functions (e.g., registers for storing values of brightness, contrast or saturation of image in an image display system). The register control module 604, coupled to the register module 602, is used for controlling the values of the registers in the register module 602. The I²C controller 606, coupled to the register module 602 and the register control module 604, is used for communicating with other I²C devices via the I²C bus. For example, the I²C controller 606 may receive indication(s) from the MCU and/or transmit indication(s) to the MCU. The multiplexer 608, coupled to the register module 602 and the I²C controller 606, is used for selecting an operation mode, i.e., the master mode or the slave mode, of the I²C device by receiving a control signal from the register module 602. The counter 610, coupled to the register control module 604, is used for configuring the period of polling the I²C device itself for the status information of the I²C device to the register control module 604.

Initially, the register control module 604 may provide a default value for the mode switch register and status register(s) in the register module 602, to control the I²C device to be in the master mode or the slave mode. Alternatively, the I²C controller 606 may receive a control signal from an external I²C device or an MCU via the I²C bus, and the control signal controls the I²C device to enter the master mode or the slave mode. When the I²C device is in the slave mode, the I²C controller 606 may receive the first indication from the MCU, which may include a write signal, an address of the mode switch register of the I²C device 104, and a value indicating the master mode. After receiving the first indication, the I²C controller 606 writes the value indicating the master mode into the mode switch register in the register module 602. The register module 602 thereby transmits a control signal to the multiplexer 608, to switch the operation mode of the I²C device from the slave mode to the master mode. When the I²C device is in the master mode, the register control module 604 then polls the register module 602 for the status information of the I²C device. In detail, the register control module 604 may transmit a polling request to the register module 602, and in response to the polling request, the register module 602 may transmit the status information stored in the status register to the register control module 604. Note that the polling operation is performed periodically, and the counter 610 may configure the period of polling the register module 602 for the status information such that the register control module 604 performs self-polling operation periodically.

Subsequently, the register control module 604 determines whether the status information of the I²C device matches the target status after receiving the status information. When determining that the status information of the I²C device matches the target status, the register control module 604 may determine to perform parameter adjustment on another I²C device of the I²C system which is to be adjusted. Therefore, the I²C controller 606 may perform the parameter adjustment on the adjusted I²C device according to instructions from the register control module 604. More specifically, the I²C controller 606 may transmit an indication, such as I4 in FIG. 5, to the adjusted I²C device via the I²C bus. Alternatively, the I²C controller 606 may transmit an indication, such as I2 in FIG. 4, to the MCU to notify the MCU to perform the parameter adjustment on the adjusted I²C device when the register control module 604 determines that the status information of the I²C device matches the target status. Detailed content and operations of these indications are described in the above paragraphs, and will not be narrated herein.

Figure 7:
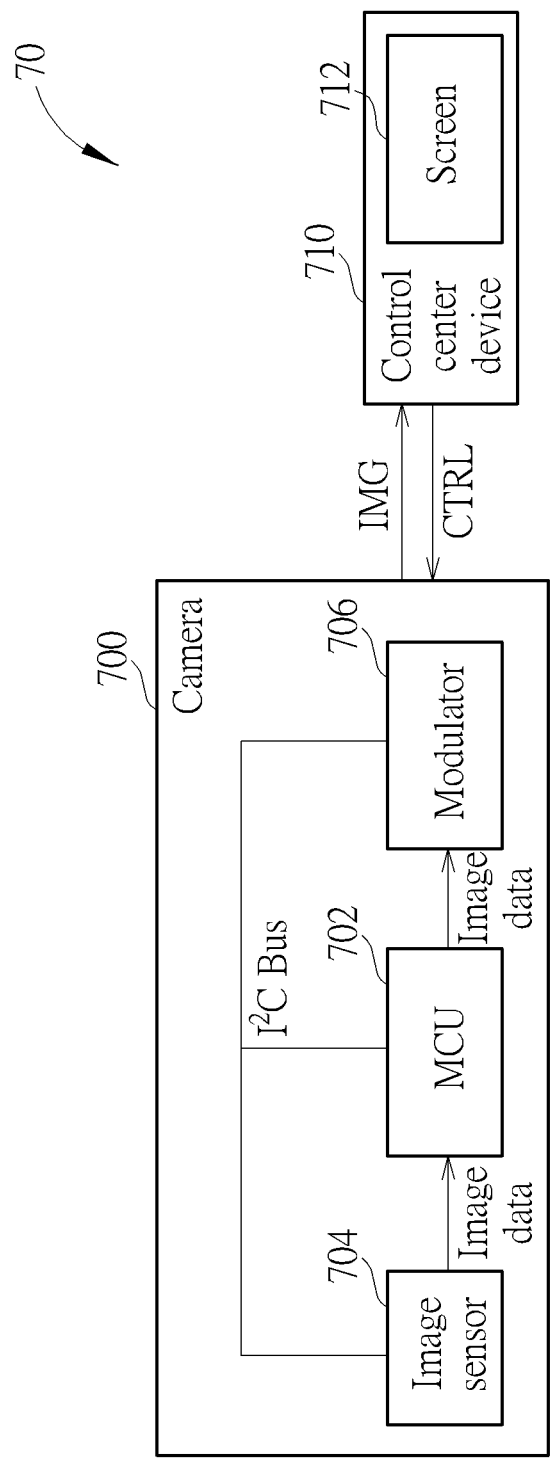
FIG. 7 is a schematic diagram of a monitoring system according to an embodiment of the present invention.

In an embodiment, the I²C system is used for data transmission in a monitoring system. Please refer to FIG. 7, which is a schematic diagram of a monitoring system 70 according to an embodiment of the present invention. The monitoring system 70 is a remote monitoring system, allowing a user to real-time monitor a target place, e.g., a room, doorway, entrance area, or a counter in a store. The monitoring system 70 includes a camera 700 and a control center device 710. The camera 700 is setup in the target place to be monitored, for receiving real-time image and transmitting the image to the control center device 710. The camera 700 includes an MCU 702, an image sensor 704 and a modulator 706, which are connected via an I²C bus. The MCU 702, operated as the MCU 100 shown in FIG. 1, is used for managing the operations of the image sensor 704 and the modulator 706. The image sensor 704, operated as the I²C device 102 shown in FIG. 1, is used for capturing image data (or video data) via a camera lens of the camera 700. The MCU 702 may receive digital image data from the image sensor 704 and forward the digital image data to the modulator 706. The modulator 706, operated as the I²C device 104 shown in FIG. 1, is used for converting the digital image data to analog image signals IMG to be transmitted to the control center device 710, to overcome signal attenuation problems in the long distance transmission. The camera 700 may be an IP camera. The control center device 710 may be an electronic device such as a computer, mobile device or vehicle electronics operated by a user. The control center device 710 may include a screen 712 for displaying the image.

In an embodiment, the MCU 702 may transmit an indication, such as the first indication I1 in FIG. 4, to the modulator 706, allowing the modulator 706 to be switched from the slave mode to the master mode. The modulator 706 then polls itself for status information. More specifically, the register control module of the modulator 706 polls the register module of the modulator 706 to check if a status (e.g., the value of a status register) of the modulator 706 changes and matches a target status. When a user of the monitoring system 70 needs to adjust the brightness of the camera 700, the user may input a command to the control center device 710. After receiving the command from the user, the control center device 710 may transmit a control signal CTRL to the modulator 706, which indicates that the brightness of the camera 700 needs to be adjusted to a target brightness value. After the modulator 706 receives the control signal CTRL from the control center device 710, a status register corresponding to the brightness in the modulator 706 may change to the target value. The target brightness value is also written into a data register in the modulator 706.

It should be noted that whether the modulator 706 receives the control signal CTRL or not yet, the modulator 706 keeps polling itself periodically. After receiving the control signal CTRL which triggers the status register to change its value, the modulator 706 may determine, based on the polled status information, that the status information corresponding to the brightness matches the target status. Therefore, the modulator 706 may configure the MCU 702 to enter the master mode via the I²C bus, allowing the MCU 702 to adjust the brightness which is set in the corresponding parameter register in the image sensor 704 according to the target brightness value obtained from the control center device 710. Alternatively, the modulator 706 may directly adjust the brightness which is set in the corresponding parameter register in the image sensor 704 via the I²C bus according to the target brightness value obtained from the control center device 710.

The above monitoring system may be applied to monitor the real-time image in any places required by the user. In an embodiment, the camera of the monitoring system may be a rear-view camera installed on a vehicle. In another embodiment, the camera of the monitoring system may be implemented with a doorbell to capture an image outside the door. In addition, the camera of the monitoring system may be integrated with a temperature sensor; hence, the self-polling operation of the present invention allows the MCU to reserve more resources for dealing with temperature sensing operations. In a further embodiment, the camera of the monitoring system is utilized for a video conference and integrated with an audio device; hence, the self-polling operation of the present invention allows the MCU to reserve more resources for managing the audio functions.

Please note that the present invention aims at providing a self-polling operation for an I²C system, allowing an I²C device to poll itself for status information of the I²C device. Those skilled in the art can make modifications and alternations accordingly. For example, in the above embodiments, the MCU is in the master mode and the I²C devices are in the slave mode in an initial condition. In another embodiment, an I²C device other than the MCU may be configured to the master mode when the I²C system is powered on. This configuration may be predefined in the I²C system and stored in registers of the I²C devices. In addition, the MCU refers to a processing unit of an electronic system, and may be replaced by a central processing unit (CPU) or another type of processor. Note that a general polling operation of an I²C system should follow the specification of the I²C system, where the polling request and response have predefined formats, allowing the master device and the slave devices to communicate with each other. On the other hand, in the embodiments of the present invention, the self-polling operation refers to an I²C device polling itself, so the formats of the polling request and response do not need to follow the I²C specification, as long as the formats of the polling request and response are recognizable by the register control module, the register module and/or other related devices in the I²C device. Furthermore, in the above embodiments, the status information refers to a value in a status register. In another embodiment, the status information may be a combination of values in multiple status registers indicating any possible statuses of the I²C device; this is not limited herein.

To sum up, the present invention provides a control method for an I²C device of an I²C system, where the I²C device is allowed to poll itself for status information of the I²C device. This reduces data transmissions for polling operation in the I²C system, and thereby improves the efficiency of the I²C system. With the self-polling operation of the present invention, the loading of the MCU is significantly reduced, so that the MCU may reserve more resources for other operations. In addition, signal transmissions on the I²C bus are reduced; this reduces electromagnetic interference problems generated from the I²C bus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a first device of an inter-integrated circuit (I²C) system comprising a microcontroller unit (MCU), the control method comprising:
receiving a first indication from the MCU of the I²C system, wherein the first indication configures the first device from a slave mode to a master mode;
polling the first device itself for status information of the first device when the first device is in the master mode;
determining whether the status information of the first device matches a target status after polling; and
determining to perform a parameter adjustment on a second device of the I²C system when determining that the status information of the first device matches the target status.

2. The control method of claim 1, further comprising:
performing the parameter adjustment on the second device in response to determining that the status information of the first device matches the target status.

3. The control method of claim 2, wherein performing the parameter adjustment on the second device comprises transmitting, via an I²C bus, an address of the second device, a write signal, an address of a parameter register to be adjusted of the second device, and a parameter value to be set in the parameter register.

4. The control method of claim 1, further comprising:
transmitting a second indication to the MCU in response to determining that the status information of the first device matches the target status, to instruct the MCU to perform the parameter adjustment on the second device.

5. The control method of claim 4, further comprising:
transmitting a third indication to the MCU, wherein the third indication configures the MCU from the slave mode to the master mode and thereby allows the MCU to perform the parameter adjustment on the second device.

6. The control method of claim 4, wherein the second indication comprises an address of the MCU, a write signal, an address of a register of the MCU or a flag of the MCU, and a value to be set in the register or in the flag, wherein the register or the flag indicates that a parameter register of the second device is to be adjusted.

7. The control method of claim 1, wherein the step of polling the first device itself for the status information of the first device comprises periodically polling the first device itself for the status information of the first device.

8. A device of an inter-integrated circuit (I²C) system, the device supporting a master mode and a slave mode, and comprising:
a register module, for storing status information and mode information of the device;
a register control module, coupled to the register module, for performing the following steps:
polling the register module for the status information of the device when the device is in the master mode;
determining whether the status information of the device matches a target status after polling; and
determining to perform a parameter adjustment on an I²C device of the I²C system when determining that the status information of the device matches the target status; and
an I²C controller, coupled to the register module and the register control module, for receiving a first indication from a microcontroller unit (MCU) of the I²C system, wherein the first indication configures the device from the slave mode to the master mode.

9. The device of claim 8, further comprising:
a multiplexer, coupled to the register module and the I²C controller, for selecting an operation mode of the device to be the master mode or the slave mode by receiving a control signal from the register module.

10. The device of claim 8, wherein the I²C controller further performs the following step:
performing the parameter adjustment on the I²C device according to instructions from the register control module.

11. The device of claim 10, wherein when performing the parameter adjustment, the I²C controller transmits, via an I²C bus, an address of the I²C device, a write signal, an address of a parameter register to be adjusted of the I²C device, and a parameter value to be set in the parameter register, which are instructed by the register control module.

12. The device of claim 8, wherein the I²C controller further performs the following step:

transmitting a second indication to the MCU in response to the register control module determining that the status information of the device matches the target status, to instruct the MCU to perform the parameter adjustment on the I²C device.

13. The device of claim 12, wherein the I²C controller further performs the following step:
transmitting a third indication to the MCU, wherein the third indication configures the MCU from the slave mode to the master mode and thereby allows the MCU to perform the parameter adjustment on the I²C device.

14. The device of claim 12, wherein the second indication comprises an address of the MCU, a write signal, an address of a register of the MCU or a flag of the MCU, and a value to be set in the register or in the flag, wherein the register or the flag indicates that a parameter register of the I²C device is to be adjusted.

15. The device of claim 8, further comprising:
a counter, coupled to the register control module, for configuring a period of polling the device itself for the status information of the device.

16. The device of claim 8, wherein the step of polling the register module for the status information of the device comprises:
transmitting, by the register control module, a polling request to the register module; and
receiving, from the register module, the status information of the device in response to the polling request.

* * * * *